Jan. 2, 1934.  R. ST. C. SEESE  1,941,511
TRIP COIL
Filed Aug. 4, 1930

Robert St. Clair Seese
INVENTOR.

Patented Jan. 2, 1934

1,941,511

UNITED STATES PATENT OFFICE 1,941,511

TRIP COIL

Robert St. Clare Seese, Detroit, Mich.

Application August 4, 1930. Serial No. 472,833

4 Claims. (Cl. 175—294)

My invention relates to trip coils for tripping circuit breakers, and more especially for tripping circuit breakers which are protected by circuit-closing relays.

The object of my invention is to provide a simple, inexpensive and reliable device for tripping circuit breakers, and especially circuit breakers in connection with which are used protective relays of the circuit-closing type; i. e., relays in which the contacts are normally open, but which close upon the occurrence of abnormal conditions of predetermined intensity in the circuit in which the circuit breaker is connected.

Other objects of the invention will appear in the further and more detailed description which follows:

It is common practice to design circuit breakers so that they tend toward the open position, and to provide a suitable latching device for holding the circuit breaker in closed position when desired, this latching device being released, when it is desired to open the circuit breaker, by energizing one or more trip coils associated with the latch, each of such trip coils being provided with a movable armature or plunger adapted to strike and release the circuit breaker latch when the trip coil is energized.

It is also common practice to provide in connection with the circuit breaker one or more relays adjusted to function when abnormal conditions of predetermined intensity appear in the circuit in which the circuit breaker is connected. The relays are so connected that they will cause the trip coils to be energized and trip the circuit breaker latch when such abnormal condition appear, thus allowing the breaker to open and interrupt its circuit. The relays are actuated by a portion of the current in the main circuit of the circuit breaker, or a definite proportion of it, and it is often desirable to have this same current energize the trip coils. Relays of modern construction are usually of the circuit-closing type, their contacts being normally open, so that the function of such relays when connected as described herein is to energize the associated trip coils only when the relays are actuated by current in excess of their settings.

Figure 1:
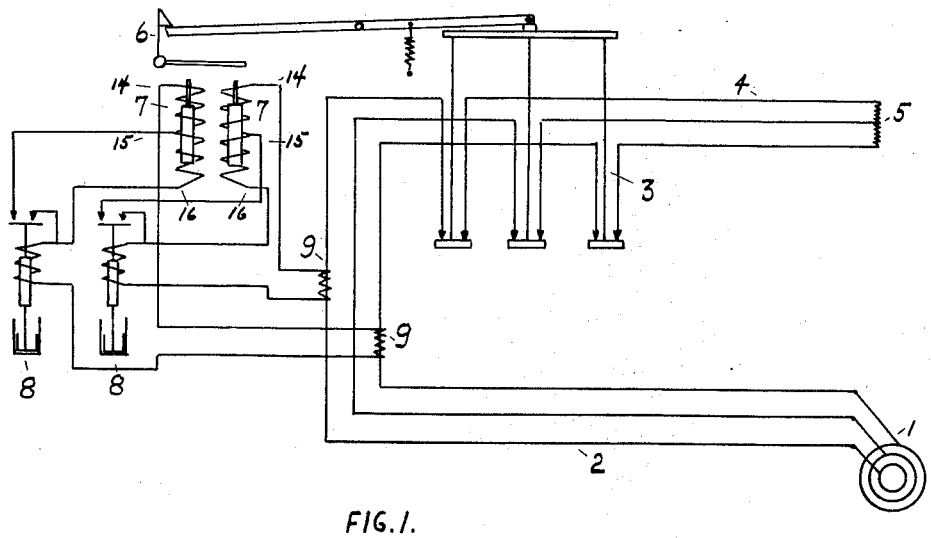
Figure 2:
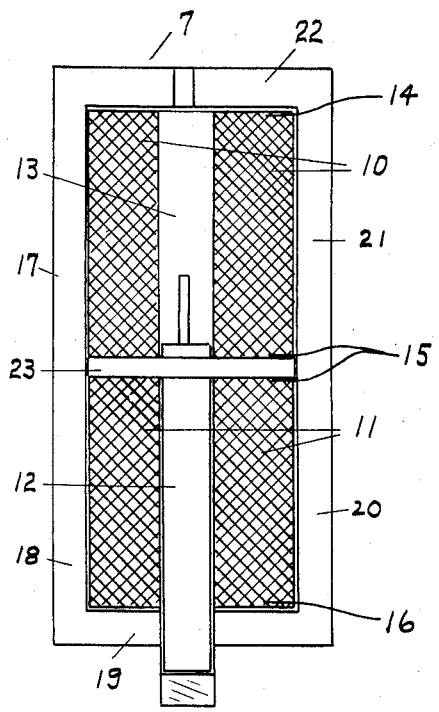
Figures 3, 4:
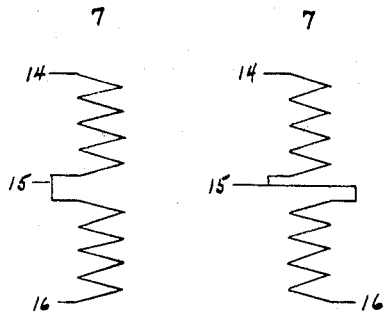

Reference is had to the accompanying drawing, forming a part of this specification, in which Figure 1 is a wiring diagram including the essential elements above described, and Figure 2 shows details of the trip coil which is the subject of this invention. Figures 3 and 4 show alternate methods of connecting the trip coil windings.

Referring to Figure 1, a source of energy 1 is connected by the supply circuit 2 thru a circuit breaker 3 to a load circuit 4 and load 5. The circuit breaker 3 is held closed by latch 6, and tends toward open position. Trip coils 7 supplied from their respective current transformers 9 are designed to operate latch 6 when energized, and thus allow the circuit breaker 3 to open. Circuit-closing relays 8 are included in the trip circuits, and are adapted to be energized from current transformers 9.

Trip coils 7 are constructed as shown in Figure 2, which represents a side elevation. A main winding 10 is connected in series with an auxiliary winding 11, and a plunger 12 is adapted to move along the axial path 13 of the two windings. With no current flowing in the windings, the plunger 12 would have the position shown in Figure 2, and upon the occurrence of current passing thru both windings 10 and 11, the plunger 12, being influenced by winding 11 more than by winding 10 on account of its position would tend to remain in the lower part of path 13. In fact, no matter what the value of current flowing thru the windings 10 and 11, the plunger will remain in the lower position. If, however, winding 11 is short circuited, thus carrying little or no current, the influence of the current still flowing thru winding 10 will pull the plunger 12 up, and, where the coil is located and connected as shown in Figure 1, such upward action of plunger 12 would trip latch 6 and open circuit breaker 3.

The action of such a trip coil arrangement may be improved by winding coils 10 and 11 in opposite directions, so that winding 11 not only has a greater influence than 10 on account of the position of plunger 12, but actually produces a field which tends to neutralize the field produced by winding 10. The volt-amperes consumed in the coils connected between terminals 14 and 16 will also be less when windings 10 and 11 are in opposite directions than otherwise, an important item where it is desired to keep the burden low on the secondaries of current transformers. Figure 3 indicates the windings of trip coil 7 in the same direction, and Figure 4 in opposite directions.

In order to increase the power of trip coils they are usually provided with a magnetic circuit which, when combined with that of the plunger produces practically a complete magnetic path when the plunger is in the actuated position. In Figure 2, the magnetic path may normally be represented by sections 17, 18, 19, 20, 21, 22. This path reduces the volt-amperes consumed in the coils connected between terminals 14 and 16 under normal conditions, and adds to the power of plunger 12 when the latter is raised. If the disk 23 which separates the two windings is of iron, then the magnetic circuit existing when winding 11 is short circuited and the plunger 12 raised is thru sections 17, 23, 21, and 22, plunger 12 acting as the return path for the magnetic flux. This use of the magnetic material for disk 23 which separates windings 10 and 11 therefore increases the power of plunger 12 when the latter is in actuated position, as well as eliminating the reluctance of that portion of the normal magnetic path represented by sections 18, 19, and 20, when plunger 12 is in the upper or actuated position. If windings 10 and 11 are wound in opposite directions and the disk 23 is made of magnetic material such as iron in addition, then the normal volt-amperes consumed in the coils connected between terminals 14 and 16 is still less.

Referring again to Figure 1, and to the operation of the apparatus, it is obvious that with the same current traversing windings 10 and 11 of the trip coils, no movement of plunger 12 can take place, due to the fields of the windings. The current setting of relay 8, above which it closes its contacts, must be above that required for winding 10 to pull up plunger 12 with winding 11 short circuited. Then, with an overload or other abnormal current in load circuit 4, sufficient to actuate relay 8 and cause it to close its contacts, the resultant short circuiting of winding 11 across terminals 15 and 16 will eliminate the restraining action of winding 11, whether such restraint is due to its advantageous position, or its neutralizing action, or both, and allow coil 10 to pull up plunger 12 and trip circuit breaker 3.

This description is only of one obvious method of accomplishing the result desired, and there are many modifications which can be used without departing from the spirit of the invention.

What I claim is:

1. In a protective system for an electric circuit embracing a source of current, a supply circuit having current transformers therein and a load circuit having therein a circuit breaker controlled by means responsive to overload conditions in said circuit, a tripping coil for opening said circuit breaker when the circuit it protects is subjected to overload conditions, said coil having two axially aligned windings connected in series and disposed in end-to-end relationship with an axially pierced disk of magnetizable material intermediately disposed between and separating the two windings, a frame of similar material outside the coil serving to provide a path for magnetic flux, said windings surrounding a magnetizable plunger axially movable within the bore of said coil, said plunger being actuated to cause the opening of said breaker only when one of said windings is automatically short-circuited and the current normally flowing therethrough drops substantially to zero, short-circuiting of said winding being effected by a relay operative only when the output of current transformers in the supply circuit is increased to a predetermined value by overload conditions arising in the protected load circuit.

2. In a protective system for an electric circuit embracing a source of current, a supply circuit, a load circuit and a circuit breaker in the load circuit, a tripping coil energized by current from the load circuit, said tripping coil operative to open said circuit breaker when the load circuit is subjected to predetermined overload conditions, said coil comprising two axially aligned windings connected in series and disposed in end-to-end relationship with an axially pierced plate of magnetizable material intermediately disposed between and separating said windings, a continuous tubular member surrounded by said windings and said pierced plate, said tubular member serving as a path thru both windings, a plunger adapted to move in an axial direction in said path and normally tending to remain in one end of said path, in which position said plunger is substantially enclosed by one of said windings, means comprising a relay adapted to be energized by current from the load circuit for short-circuiting the last-mentioned winding of said coil, the other winding adapted to move said plunger from its normally tending position upon the occurrence of a current of predetermined strength in said winding and corresponding short-circuiting of the other winding by actuation of said relay.

3. In a protective system for an electric circuit embracing a source of current, a supply circuit having current transformers therein and a load circuit having therein a circuit breaker controlled by means responsive to overload conditions in said circuit, a tripping coil for opening said circuit breaker when the circuit it protects is subjected to overload conditions, said coil having two axially aligned windings connected in series and disposed in end-to-end relationship, a frame of similar material outside the coil serving to provide a path for magnetic flux, said windings surrounding a magnetizable plunger axially movable within the bore of said coil, said plunger being actuated to cause the opening of said circuit breaker only when one of said windings is automatically short circuited and the current normally flowing therethrough drops substantially to zero, short-circuiting of said winding being effected by a relay operative only when the output of current transformers in the supply circuit is increased to a predetermined value by overload conditions arising in the protected load circuit.

4. In a protective system for an electric circuit embracing a source of current a supply circuit, a load circuit, and a circuit breaker in the load circuit, a tripping coil energized by current from the load circuit, said tripping coil operative to open said circuit breaker when the load circuit is subjected to predetermined overload conditions, said coil comprising two axially aligned windings connected in series and disposed in end-to-end relationship, a continuous tubular member surrounded by said windings, said tubular member serving as a path thru both windings, a plunger adapted to move in an axial direction in said path and normally tending to remain in one end of said path, in which position said plunger is substantially enclosed by one of said windings, means comprising a relay adapted to be energized by current from the load circuit for short-circuiting the last mentioned winding of said coil, the other winding adapted to move said plunger from its normally tending position upon the occurrence of a current of predetermined strength in said winding and corresponding short-circuiting of the other winding by actuation of said relay.

ROBERT ST. CLARE SEESE.